(12) United States Patent
Patel et al.

(10) Patent No.: US 11,432,377 B2
(45) Date of Patent: Aug. 30, 2022

(54) SYSTEM, METHOD, AND DEVICE FOR PREVENTING OR MITIGATING CONDENSATION

(71) Applicants: Robern, Inc., Bristol, PA (US); Kohler Co., Kohler, WI (US)

(72) Inventors: Harshil N. Patel, Mount Laurel, NJ (US); George Wahlgren, Medford Lakes, NJ (US); James L. Stanley, Jr., Levittown, PA (US)

(73) Assignees: Robern, Inc.; Kohler Co.

( * ) Notice: Subject to any disclaimer, the term of this patent is extended or adjusted under 35 U.S.C. 154(b) by 380 days.

(21) Appl. No.: 16/597,095

(22) Filed: Oct. 9, 2019

(65) Prior Publication Data
US 2020/0113021 A1 Apr. 9, 2020

Related U.S. Application Data

(60) Provisional application No. 62/742,968, filed on Oct. 9, 2018.

(51) Int. Cl.
*H05B 3/84* (2006.01)
*G01N 25/66* (2006.01)
(Continued)

(52) U.S. Cl.
CPC ............. *H05B 3/845* (2013.01); *B60S 1/023* (2013.01); *G01N 25/66* (2013.01); *A47G 1/02* (2013.01);
(Continued)

(58) Field of Classification Search
CPC ............. H05B 3/845; H05B 1/0236; H05B 2203/003; H05B 2203/014; B60S 1/023;
(Continued)

(56) References Cited

U.S. PATENT DOCUMENTS 4,037,079 A 7/1977 Armbruster
4,882,467 A 11/1989 Dimick
(Continued)

FOREIGN PATENT DOCUMENTS

CN 104808722 7/2015
CN 105433671 A 3/2016
(Continued)

*Primary Examiner* — Roy Y Yi
*Assistant Examiner* — Geoffrey T Evans
(74) *Attorney, Agent, or Firm* — The Belles Group, P.C.

(57) ABSTRACT

In an embodiment, the present disclosure is directed to an assembly for preventing condensation on a surface of an object. The assembly may include a condensation mitigation device; a surface temperature sensor configured to sense a temperature; an ambient temperature sensor configured to sense an ambient temperature; and a humidity sensor configured to sense a humidity. The condensation mitigation device may be operably coupled to the surface temperature sensor, the ambient temperature sensor, and the humidity sensor. The condensation mitigation device may be configured to calculate a dewpoint temperature based on the ambient temperature and the humidity; repeat the calculation of the dewpoint temperature for different times; calculate a linear regression for the calculated dewpoint temperatures; and transmit a control signal to begin activating the condensation mitigation device based on the surface temperature, the current dewpoint temperature, and the linear regression for the calculated dewpoint temperatures.

20 Claims, 6 Drawing Sheets

(51) Int. Cl.
*B60S 1/02* (2006.01)
*A47G 1/02* (2006.01)
*H05B 1/02* (2006.01)

(52) U.S. Cl.
CPC .. *A47G 2200/066* (2013.01); *A47G 2200/166* (2013.01); *H05B 1/0236* (2013.01); *H05B 2203/003* (2013.01); *H05B 2203/014* (2013.01)

(58) Field of Classification Search
CPC .... G01N 25/66; A47G 1/02; A47G 2200/066; A47G 2200/166
See application file for complete search history.

(56) References Cited

U.S. PATENT DOCUMENTS

| | | | |
|---|---|---|---|
| 4,956,542 | A | 9/1990 | Prosser |
| 5,063,283 | A | 11/1991 | Orazi |
| 5,302,809 | A | 4/1994 | Ghiassy |
| 5,347,106 | A | 9/1994 | Reiser et al. |
| D364,225 | S | 11/1995 | Canney |
| 5,467,423 | A | 11/1995 | Jakubowski |
| 6,049,069 | A | 4/2000 | Hochstein |
| 6,144,017 | A | 11/2000 | Millett et al. |
| 6,420,682 | B1 | 7/2002 | Sellgren et al. |
| 6,470,696 | B1 | 10/2002 | Palfy et al. |
| 6,653,606 | B1 | 11/2003 | Son et al. |
| 6,796,665 | B1 | 9/2004 | Pillinger |
| 7,131,739 | B2 | 11/2006 | Sellgren et al. |
| 7,231,727 | B2 | 6/2007 | Kang et al. |
| 7,265,323 | B2 | 9/2007 | Gerhardinger et al. |
| 8,420,985 | B2 | 4/2013 | Dallaire |
| 8,870,394 | B2 | 10/2014 | Lee et al. |
| 9,612,035 | B1 | 4/2017 | Winters |
| 9,751,498 | B2 | 9/2017 | Lisinski et al. |
| 2004/0050076 | A1* | 3/2004 | Palfy ................ G01N 25/68 62/155 |
| 2004/0206739 | A1 | 10/2004 | Duance |
| 2005/0152431 | A1* | 7/2005 | Jensen ............... G01N 25/64 374/16 |
| 2005/0205549 | A1 | 9/2005 | Crawford et al. |
| 2007/0267400 | A1 | 11/2007 | Chen et al. |
| 2015/0060431 | A1 | 3/2015 | Yang et al. |
| 2015/0334779 | A1 | 11/2015 | Phan et al. |
| 2017/0052023 | A1 | 2/2017 | Hung et al. |
| 2017/0238730 | A1 | 8/2017 | Schalich |

FOREIGN PATENT DOCUMENTS

| | | |
|---|---|---|
| CN | 205208310 U | 5/2016 |
| CN | 105640172 A | 6/2016 |
| CN | 207744960 U | 8/2018 |
| DE | 102015220660 B3 | 3/2017 |
| JP | 2000139647 A | 5/2000 |
| NL | 9201817 | 10/1992 |
| WO | WO2017003471 A1 | 1/2017 |
| WO | WO 2018086426 A1 | 5/2018 |

* cited by examiner

SYSTEM, METHOD, AND DEVICE FOR PREVENTING OR MITIGATING CONDENSATION

CROSS REFERENCE TO RELATED APPLICATIONS

The present application claims the benefit of U.S. Provisional Patent Application No. 62/742,968 filed on Oct. 9, 2018, which is incorporated herein by reference.

BACKGROUND

Mirrors and glass are known to fog when condensation occurs. For example, a bathroom mirror may become foggy as the room fills with steam caused by the shower. The mirror may remain fogged for an extended period after the condensation first forms, preventing it from being used for its intended purpose. Previous attempts to address this problem have been met with limited success. Although ceiling fans and exhaust fans may clear steam, they are generally not automated. Further, existing automated solutions do not adequately anticipate when condensation will form, and thus are not triggered in sufficient time to prevent condensation. It is therefore desired for a method, system, or device for preventing condensation on a mirror, glass, or other object in an automatic fashion.

BRIEF SUMMARY

The present disclosure may be directed, in one aspect, to an assembly for preventing condensation on a surface of an object. The assembly may include a condensation mitigation device positioned on or near an object; a processor operably coupled to the condensation mitigation device; a surface temperature sensor positioned on or near a surface of the object to sense a temperature; an ambient temperature sensor positioned in an area in which the object is located to sense an ambient temperature; and a humidity sensor positioned in the area in which the object is located to sense a humidity. The processor is operably coupled to the surface temperature sensor, the ambient temperature sensor, and the humidity sensor. The processor is configured to calculate a dewpoint temperature based on the ambient temperature and the humidity; repeat the calculation of the dewpoint temperature for different times, the calculated dewpoint temperatures including a current dewpoint temperature; calculate a linear regression for the calculated dewpoint temperatures; and transmit a control signal to begin activating the condensation mitigation device, and thereby prevent condensation from forming on the surface of the object. The transmission of the control signal may be based on the surface temperature, the current dewpoint temperature, and/or the linear regression for the calculated dewpoint temperatures.

In another aspect, a method for preventing condensation on a surface of an object includes positioning a condensation mitigation device on or near an object; operably coupling the condensation mitigation device, a surface temperature sensor, an ambient temperature sensor, and a humidity sensor to a processor; positioning the surface temperature sensor on or near a surface of the object to sense a surface temperature; positioning the ambient temperature sensor to sense an ambient temperature in an area in which the object is located; positioning the humidity sensor to sense a humidity in the area in which the object is located; calculating, by the processor, a dewpoint temperature based on the ambient temperature and the humidity; and repeating the calculation of the dewpoint temperature for different times, the calculated dewpoint temperatures including a current dewpoint temperature. The method further includes calculating, by the processor, a linear regression for the calculated dewpoint temperatures; and transmitting, by the processor, a control signal to begin activating the condensation mitigation device, and thereby prevent condensation from forming on the surface of the object, wherein the transmission of the control signal is based on the surface temperature, the current dewpoint temperature, and the linear regression for the calculated dew point temperatures.

In another aspect, a non-transitory computer-readable storage medium is provided. The non-transitory computer-readable storage medium may be encoded with instructions which, when executed on a processor, calculate a dewpoint temperature based on an ambient temperature and a humidity. An ambient temperature sensor may be positioned to sense the ambient temperature in an area in which an object is located; the humidity sensor may be positioned to sense the humidity in the area in which the object is located; and a surface temperature sensor may be positioned on or near a surface of the object to sense the surface temperature. The calculation of the dewpoint temperature may be repeated for different times, the calculated dewpoint temperatures including a current dewpoint temperature. A linear regression may be calculated for the calculated dewpoint temperatures. A control signal may be transmitted, by the processor, to begin activating the condensation mitigation device, thereby prevent condensation from forming on the surface of the object. The transmission of the control signal may be based on the surface temperature, the current dewpoint temperature, and/or the linear regression for the calculated dewpoint temperatures.

BRIEF DESCRIPTION OF THE DRAWINGS

The present disclosure will become more fully understood from the detailed description and the accompanying drawings, wherein.

DETAILED DESCRIPTION

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Figure 1:
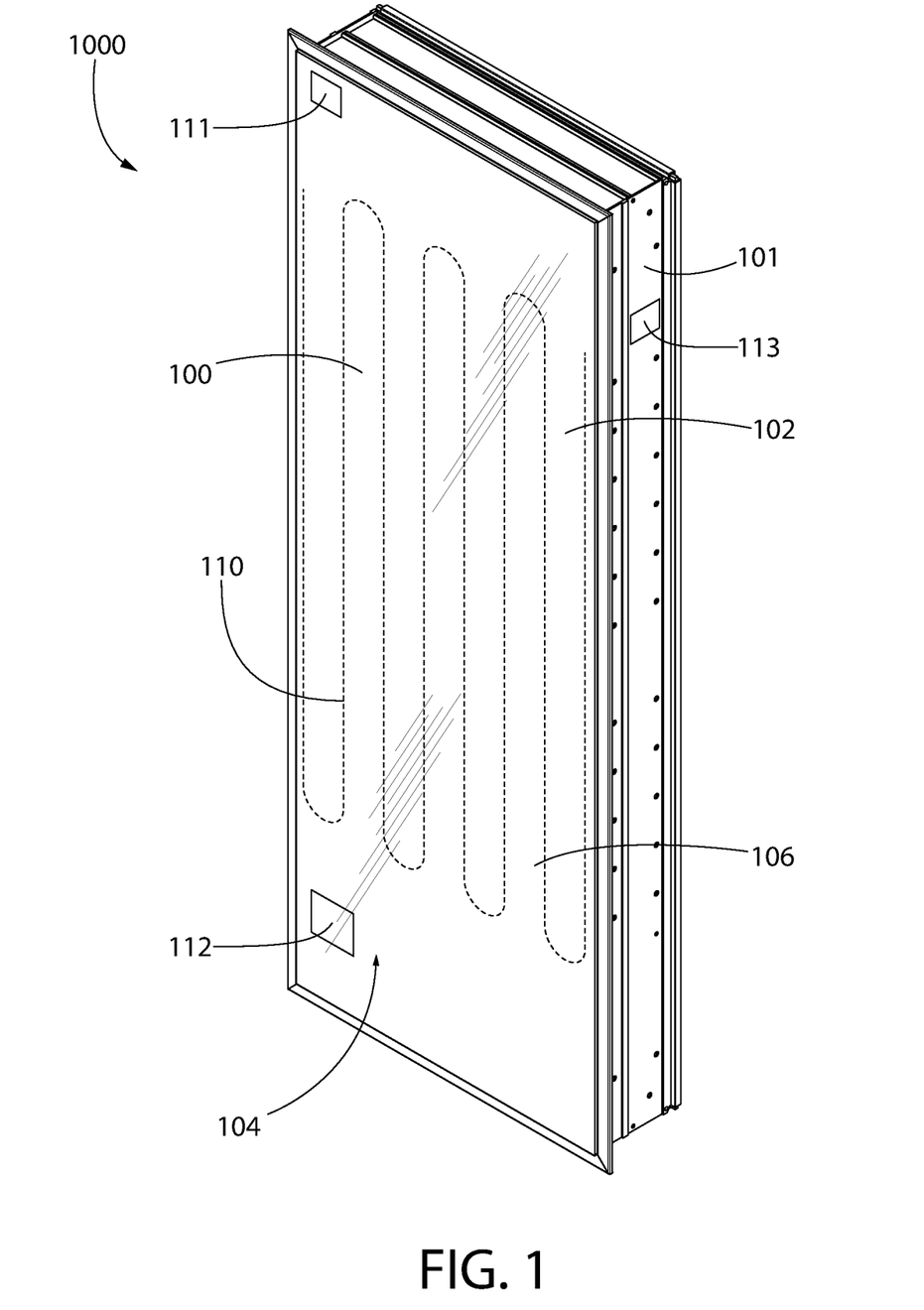
FIG. 1 is a front perspective view of an example cabinet having a condensation mitigation device, as described herein.

Referring to the figures, FIG. 1 shows an example system 1000 for preventing condensation on an object. Although the below examples describe preventing condensation on a mirror (in particular, a bathroom mirror), it should be understood that these examples are for illustration purposes only and are non-limiting. Systems and methods for preventing condensation on an object may include preventing condensation on any mirror, such as a bathroom mirror and vehicle mirror, glass, tile, and any other surface that may be affected by condensation, steam, and/or fog.

As shown on FIG. 1, system 1000 may comprise a cabinet 100. The cabinet 100 may include a cabinet housing 101 and a door 102 coupled to the cabinet housing 101. The door 102 may be pivotably coupled to the cabinet housing 101 by one or more hinges that permit the door 102 to open and close relative to the cabinet housing 101. The cabinet housing 101 and the door 102 collectively form a cabinet storage compartment. In examples the cabinet 100 may be used as a bathroom cabinet or a medicine cabinet to store items that are used in the bathroom, such as a toothbrush, toothpaste, contact lenses, feminine hygiene products, deodorant, medicine, or the like. Of course, other uses for the cabinet 100 are possible and within the scope of this application.

The door 102 may comprise an outer surface 104 that is exposed when the door 102 is in the closed state. The outer surface 104 of the door 102 may also be exposed when the door 102 is in the open state. In embodiments, the door 102 may be a mirrored door. For example, the door 102 may have a first mirror 106 having a reflective surface forming the outer surface 104 of the door 102. Of course, the invention is not to be so limited and in other examples one or both of the surfaces of the door 102 may not be mirrored or reflective surfaces.

As shown on FIG. 1, the system 1000 may include one or more devices, such as a surface temperature sensor 112, an ambient temperature sensor 111, and/or a humidity sensor 113. Surface temperature sensor 112, ambient temperature sensor 111, and humidity sensor 113 may be positioned on or about one or more objects of system 1000, such as on or about a mirror (e.g., first mirror 106), glass, tile, and the like. Surface temperature sensor 112 may be configured to sense a temperature on or near a surface of an object. Ambient temperature sensor 111 may be configured to sense an ambient temperature in an area in which the object (e.g., first mirror 106) is located. Humidity sensor 113 may be configured to sense a humidity in the area in which the object is located. As described herein, although a mirror is described as an example object, such example is for illustration purposes only and is not limiting in any way. For example, the object may be glass (e.g., glass on a shower stall, a window, a windshield), metal (e.g., a metal fixture), a mirror (e.g., bathroom mirrors, accessory mirrors, rearview mirrors), tiles, and the like.

System 1000 may also, or alternatively, include a condensation mitigation device 110. Condensation mitigation device 110 may be configured to prevent condensation from forming on an object, to remove condensation that has formed on an object, and to mitigate condensation from forming and/or which has formed on the object. Examples of condensation mitigation device 110 may include, but are not limited to, a heating element, a fan, a blower, and the like. The condensation mitigation device 110 may be coupled to (e.g., operably coupled to) one or more of surface temperature sensor 112, ambient temperature sensor 111, or humidity sensor 113. For example, the condensation mitigation device 110 may receive signals from one or more of surface temperature sensor 112, ambient temperature sensor 111, or humidity sensor 113. The signals may indicate surface temperatures of the object, ambient temperatures about the object, and/or humidity conditions about the object.

As shown on FIG. 1, surface temperature sensor 112, ambient temperature sensor 111, humidity sensor 113, and/or condensation mitigation device 110 may be positioned at one or more locations on or near system 1000. For example, condensation mitigation device 110 may be positioned on (e.g., affixed to) the surface of the object. Surface temperature sensor 112 may be positioned at a predetermined distance from condensation mitigation device 110. Ambient temperature sensor 111 may be positioned at or near a top or side of the object. For example, ambient temperature sensor 111 may be positioned at or near a top side of the object. Humidity sensor 113 may be positioned at or near a top or side of the object. For example, humidity sensor 113 may be positioned at or near a top side of the object.

Condensation mitigation device 110 may be configured to calculate one or more dewpoint temperatures. The dewpoint temperatures may be based on an ambient temperature and/or a humidity, which may be provided by ambient temperature sensor 111 and/or humidity sensor 113. Condensation mitigation device 110 may calculate a dewpoint temperature one or more times. For example, condensation mitigation device 110 may calculate a dewpoint temperature every five seconds, thirty seconds, one minute, five minutes, etc. Further, condensation mitigation device 110 may calculate a dewpoint temperature based on an event (e.g., a motion detected near condensation mitigation device 110, a light being turned on, etc.), a time of day, a period of time, a date, etc.

Condensation mitigation device 110 may calculate a regression (e.g., linear regression) for one or more of the calculated dewpoint temperatures. Based on one or more of the calculated dewpoint temperatures (e.g., current dewpoint temperature and previous dewpoint temperatures), surface temperature, and/or a linear regression of the calculated dewpoint temperatures, condensation mitigation device 110 may determine and/or transmit a signal. The signal may be a control signal that may be used to indicate to condensation mitigation device 110 (or another device) to prevent, mitigate, and/or remove condensation. For example, the signal may be a control signal that may be used to indicate to condensation mitigation device 110 (or another device) to take action to prevent, reduce, and/or remove condensation from forming on a surface of the object.

FIG. 1 shows example positioning of the surface temperature sensor 112, ambient temperature sensor 111, humidity sensor 113, and/or condensation mitigation device 110. For example, FIG. 1 shows surface temperature sensor 112 and condensation mitigation device 110 being positioned on first mirror 106, ambient temperature sensor 111 being positioned on the top of cabinet 100, and humidity sensor 113 being positioned on the side of cabinet 100. In other examples surface temperature sensor 112, condensation mitigation device 110, ambient temperature sensor 111, and humidity sensor 113 may be positioned inside of cabinet 100, including inside of door 102. In other examples, however, surface temperature sensor 112, condensation mitigation device 110, ambient temperature sensor 111, and/or humidity sensor 113 may be positioned on or about one or more sides (e.g., front, bottom, sides, back, etc.) of system 1000.

Condensation mitigation device 110 may have a surface area that is less than or equal to the surface area of the object (e.g., the surface area of a mirror). In examples in which condensation mitigation device 110 is a heating element, condensation mitigation device 110 may be centrally located on the surface of the object. For example, condensation mitigation device 110 may be centrally located on the front and/or back of a mirror. In examples in which condensation mitigation device 110 is a heating element, condensation mitigation device 110 may be a resistive heating element in the form of an adhesive backed flexible rectangular pad or the like. In examples in which condensation mitigation device 110 is a fan or blower, condensation mitigation device 110 may be positioned along an edge of the object and may blow air towards the surface of the object. For example, condensation mitigation device 110 may be a blower positioned along a bottom edge of a mirror and may direct air flow in an upwards direction towards the surface of the mirror.

Surface temperature sensor 112, ambient temperature sensor 111, and/or humidity sensor 113 may be positioned a distance from the condensation mitigation device 110, for example, so that condensation mitigation device 110 does not affect the readings of one or more of the sensors. Surface temperature sensor 112, condensation mitigation device 110, ambient temperature sensor 111, and/or humidity sensor 113 may be located on an outside of door 102 or on an inside of door 102. Surface temperature sensor 112, condensation mitigation device 110, ambient temperature sensor 111, and/or humidity sensor 113 may be embedded within the door 102 such that one or more of the sensors or devices are not exposed on the inner or outer surfaces of the door 102. Surface temperature sensor 112, condensation mitigation device 110, ambient temperature sensor 111, and/or humidity sensor 113 may be located entirely within a cavity of the door 102.

Surface temperature sensor 112, condensation mitigation device 110, ambient temperature sensor 111, and/or humidity sensor 113 may be coupled to the object (e.g., mirror, Mass, metal) using any desired technique, such fasteners, screws, nails, adhesive, hook-and-loop, mechanical interaction, or the like. One or more of the surface temperature sensor 112 and condensation mitigation device 110 may be coupled directly to the inner and/or outer surface of the door 102 such that the surface temperature sensor 112 and/or condensation mitigation device 110 is visible and exposed. Further, although the surface temperature sensor 112, condensation mitigation device 110, ambient temperature sensor 111, and/or humidity sensor 113 may be directly coupled to system 1000, in other examples the surface temperature sensor 112, condensation mitigation device 110, ambient temperature sensor 111, and/or humidity sensor 113 may be positioned at other locations along the system 1000, such as next to cabinet 100.

As described herein, the condensation mitigation device 110 may be used to prevent, remove, or mitigate condensation on one or more objects, such as a mirror, glass, metal, tile, etc. Condensation mitigation device 110 may be configured to prevent, remove, or mitigate condensation on one or more objects based on one or more dewpoint temperatures. Dewpoint calculations may be performed via one or more methods or equations. For example, the Magnus Equation may be used to calculate one or more dew points.

Figure 2:
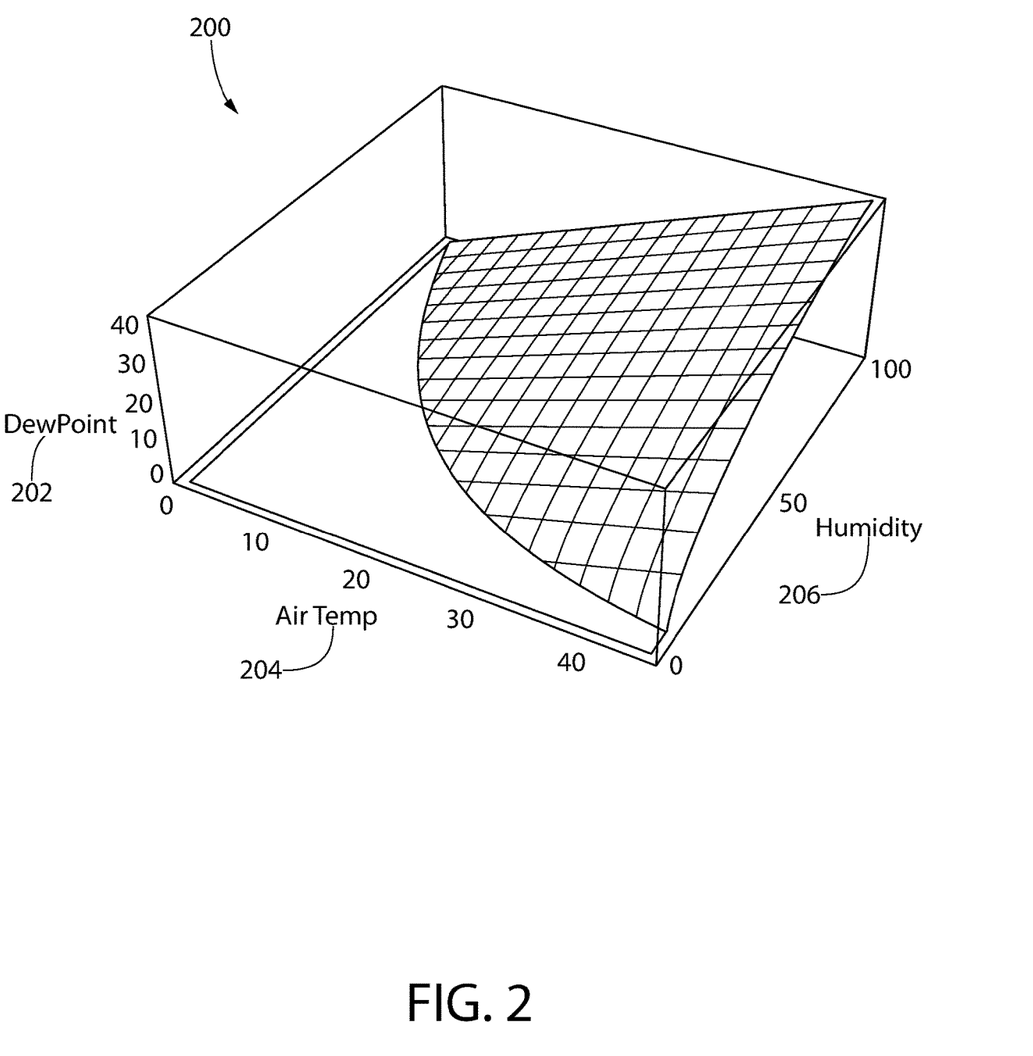
FIG. 2 shows a plot of an example relationship between dew point, air temperature, and relative humidity.

FIG. 2 shows a plot illustrating an example relationship between dew point 202, air temperature 204, and relative humidity 206. The temperatures shown in FIG. 2 are in degrees Celsius and humidity is measured as a percentage. The example output range for the dew point 202 on FIG. 2 is limited to a range for a user's shower space, although in other examples the range may be larger or less than that shown on FIG. 2. The below equations are used by condensation mitigation device 110 to prevent, remove, or reduce condensation based on one or more of the conditions determined by surface temperature sensor 112, ambient temperature sensor 111, and/or humidity sensor 113, as described herein.

Equation 1 shows a relationship between air temperature (T) and relative humidity (RH).

$$\gamma(T, RH) = \ln\left(\frac{RH}{100}\right) + \frac{b \times T}{c + T} \quad \text{Equation 1}$$

Equation 2 shows a computation of dew point temperature.

$$T_{dp} = \frac{c \times \gamma(T, RH)}{b - \gamma(T, RH)} \quad \text{Equation 2}$$

With respect to Equations 1 and 2, b may be a constant equal to 17.368; c may be a constant equal to 238.88.

As described herein, water vapor in the air may condense on a surface (e.g., a surface of a mirror) when the temperature of the surface is at or below the dew point temperature. Such condensation on the surface may result in the surface becoming fogged. Equation 3 shows a comparison of surface temperature ($T_{surf}$) and dew point temperature ($T_{dp}$).

$$T_{surf} \leq T_{dp} \quad \text{Equation 3}$$

Condensation mitigation device 110 may be configured to prevent, remove, or reduce condensation on an object based on one or more conditions. For example, condensation mitigation device 110 may be configured to prevent, remove, or reduce condensation on an object based on surface temperature. More specifically, condensation mitigation device 110 may be configured to prevent condensation on an object based on a relationship between surface temperature and dew point temperature. In an example, condensation mitigation device 110 may be activated when the surface temperature of an object is less than or equal to the dewpoint temperature (e.g., when the condition defined in Equation 3 is met).

Condensation mitigation device 110 may be activated when the surface temperature of an object is less than or equal to the dewpoint temperature to mitigate the formation of condensation, as shown in Equation 4. For example, a heating element, blower, or fan may be activated when the surface temperature of an object is less than or equal to the dewpoint temperature.

$$\text{if } (T_{surf} \leq T_{dp}), \text{ then } \{\text{Activate Condensation Mitigation Device}\} \quad \text{Equation 4}$$

As understood by those of skill in the art, a condensation mitigation device 110 (e.g., heating element, fan, blower) may not instantaneously provide a preventative condensation condition upon activation. For example, a condensation mitigation device 110 may not instantaneously remove condensation from a surface of an object by heating the object and/or providing an airing of the object upon activation of the condensation mitigation device 110.

Because the condensation mitigation device 110 may not instantaneously provide a preventative condensation condition upon the object, the condensation mitigation device 110 may be preemptively activated. The condensation mitigation device 110 may be activated (e.g., preemptively activated) so that the object is sufficiently heated and/or aired by the time the trigger condition of condensation formation is met. For example, a threshold value (e.g., threshold temperature) may be added to the trigger condition. Equation 5 shows an example of adding the threshold value to the trigger condition.

$$\text{if } (T_{surf} \leq (T_{dp} + T_{thresh})), \text{ then } \{\text{Activate Condensation Mitigation Device}\} \quad \text{Equation 5}$$

The threshold value (e.g., threshold temperature) may be sized such that it can enable the condensation mitigation device 110 to prevent condensation without prematurely activating condensation mitigation device 110. For example, the threshold value may be sized such that it can enable the condensation mitigation device 110 to prevent condensation while not causing the condensation mitigation device 110 to be activated before such activation can be used to prevent condensation. The threshold value may enable the condensation mitigation device 110 to be activated (e.g., preemptively activated) when the current dew point is below the surface temperature. In examples the threshold value may be small enough that it does not falsely initiate a trigger if condensation conditions are not (or will not) be present. The threshold may be large enough that the threshold value can be used activate the condensation mitigation device 110 soon enough, for example, so the activation of the condensation mitigation device 110 prevents the mirror from fogging once condensation conditions present themselves. The threshold value may dynamically change. The threshold value may be dependent on temporary (e.g., transient) ambient conditions.

Ambient temperature and/or ambient humidity may change (e.g., fluctuate) in one or more areas, such as in a bathroom, inside/outside of a vehicle, and the like. Ambient temperature and/or ambient humidity may change throughout the day, which may be dependent on the size of the area (e.g., room vehicle), the location of surface (e.g., inside a room, outside a vehicle), existing ventilation, etc. Ambient conditions (e.g., average ambient conditions) may vary based on one or more variables, such as geographic location, time of day, and/or time of year. As such, the threshold value may not be dependent on the value (e.g., actual value) of the temperature and/or humidity at a given moment. Rather, the threshold value may be dependent on a rate of change (e.g., an instantaneous rate of change) of the temperature and/or humidity. The instantaneous rate of change for the ambient temperature and/or humidity may be based on the slope of a linear regression for sensor data over a duration. For example, the instantaneous rate of change for the ambient temperature and/or humidity may be based on the slope of a linear regression for sensor data over ten seconds, thirty seconds, one minute, five minutes, etc.

Effects (e.g., relative effects) of the ambient temperature and relative humidity may be combined into a value (e.g., a dew point value). The combined relative effects of the ambient temperature and relative humidity may be used to determine the threshold value. The combined relative effects of the ambient temperature and relative humidity may be used to determine the threshold value given that the humidity or the temperature can fluctuate independent of one another, for example, in a way that does not result in condensation conditions. The interdependent relationship between the dew points is an important factor in predicting when condensation will occur.

Figure 3:
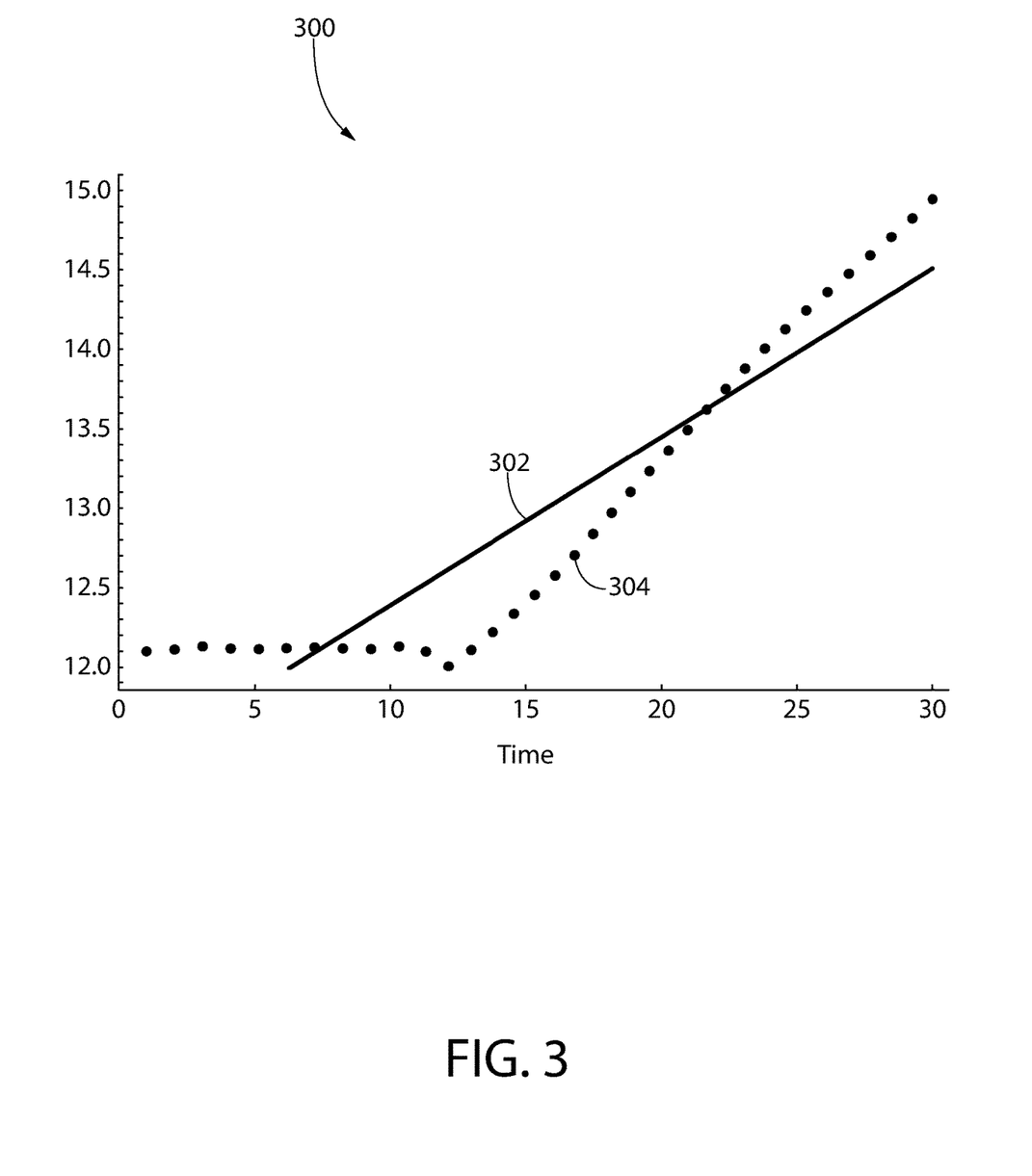
FIG. 3 shows is a plot of an example sampling of dew point data and a calculated linear regression.

As described herein, dew point data may be collected, and a linear regression (e.g., a liner regression of the dew point data) may be calculated. FIG. 3 shows an example 300 sampling of dew point data 304 and a calculated linear regression 302. FIG. 3 shows the best fit line for a sample size of n=30, however, this sample size is a non-limiting example Samples sizes may be larger, or smaller, in other examples.

The plot shown on FIG. 3 may be determined using one or more values, such as the example values provided below:
dataTdp:={12.11, 12.11, 12.13, 12.11, 12.12, 12.12, 12.13, 12.12, 12.12, 12.12, 12.13, 12.00, 12.12, 12.24, 12.42, 12.58, 12.75, 12.96, 13.15, 13.34, 13.51, 13.69, 13.86, 13.99, 14.17, 14.30, 14.48, 14.63, 14.81, 14.94}

$$\text{slope} = \frac{(N \sum xy) - (\sum x)(\sum y)}{(N \sum x^2) - (\sum x)^2} \quad \text{Equation 6}$$

Where the variables may be defined as follows: N=total number of data points; X=Set of all x-coordinates for all data points; Y=Set of all y-coordinates for all data points.

Equation 6 calculates a slope of the best fit line for given data. The value of the slope may be used to determine the threshold used by Equation 5. A lower slope may indicate a slow rise of the dew point and require that a lower threshold be used (e.g., the heater would not be required to be turned on in advance of condensation conditions). A greater slope may indicate a more rapid rise in dew point facilitating the need for a greater threshold (e.g., the heater would need to be on sooner, for example, to be hot enough for when condensation conditions become present).

The time required for the dew point to reach a surface temperature (e.g., the current surface temperature) may be calculated (e.g., predicted). For example, the time required for the dew point to reach the current surface temperature may be calculated (e.g., predicted) by extrapolating the linear regression. The time required for the dew point to reach the current surface temperature may be used to refine the threshold determination. The condensation mitigation device may be activated based on time required for the dew point to reach a surface temperature and/or based on the threshold determination.

A relationship between the temperature difference and the time required for the dew point to reach the current surface temperature may be determined as follows:

$$T_{thresh} = \frac{Limit^{(Limit-Time)}}{Time} \quad \text{Equation 7}$$

$$Time = \left| \frac{T_{surf} - T_{dp}}{slope} \right| \quad \text{Equation 8}$$

Equation 7 uses a constant value referred to herein as Limit. The Limit value may be chosen based on the desired preemption of a triggering algorithm.

Figure 4:
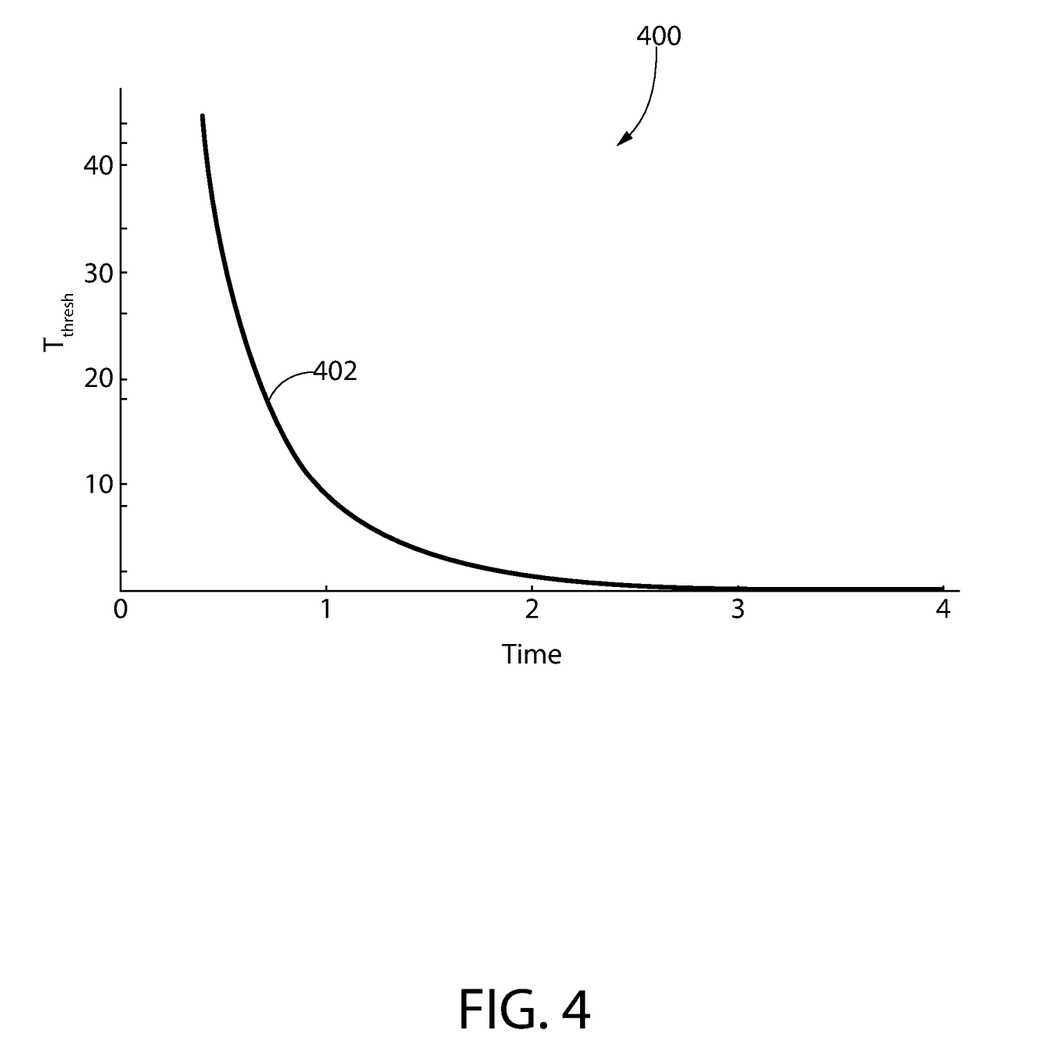
FIG. 4 is a plot of example threshold values, as described in Equation 7.

FIG. 4 shows an example plot 400 of Equation 7, where the Limit is 3. As shown on FIG. 4, the value for $T_{thresh}$ 402 becomes large when the value for Time is less than the value for Limit. As such, Equation 5 may evaluate (e.g., only evaluate) to true (and activate the condensation mitigation device 110) if condensation conditions are present or will be present in the number of minutes less than or equal to Limit. Said another way, the system may be configured to determine if condensation conditions are going to form in the next Limit minutes (e.g., 3 minutes) to determine if the system should trigger the condensation mitigation device or should not trigger the condensation mitigation device. Increasing the value of Limit may enable the triggering algorithm to be more sensitive to changes in ambient conditions and/or may result in an increase in false positives. The value for Limit may be determined empirically, predetermined, provided via one or more sources, and the like.

An example process for providing the plot shown on FIG. 4 is as follows:
lim=3
g[t_]:=(lim^(lim−t))/t
Plot[g[t], {t,0,lim+1}, PlotRange→Automatic]

As shown on FIG. 4, the graph has a vertical asymptote at t=0 and a horizontal asymptote as t→∞, where:

$$\lim_{t \to \infty} g[t] = 0 \text{ and } \lim_{t \to 0^+} g[t] = \infty.$$

As provided herein, examples are provided for sensing ambient conditions. An example 500 may be shown on FIG. 5. At 502, ambient conditions, such as ambient temperature, ambient relative humidity, and/or a surface temperature, may be sensed. Ambient temperature, ambient relative humidity, and/or a surface temperature are non-limiting examples of ambient conditions. In other examples other ambient conditions may be sensed.

Figure 5:
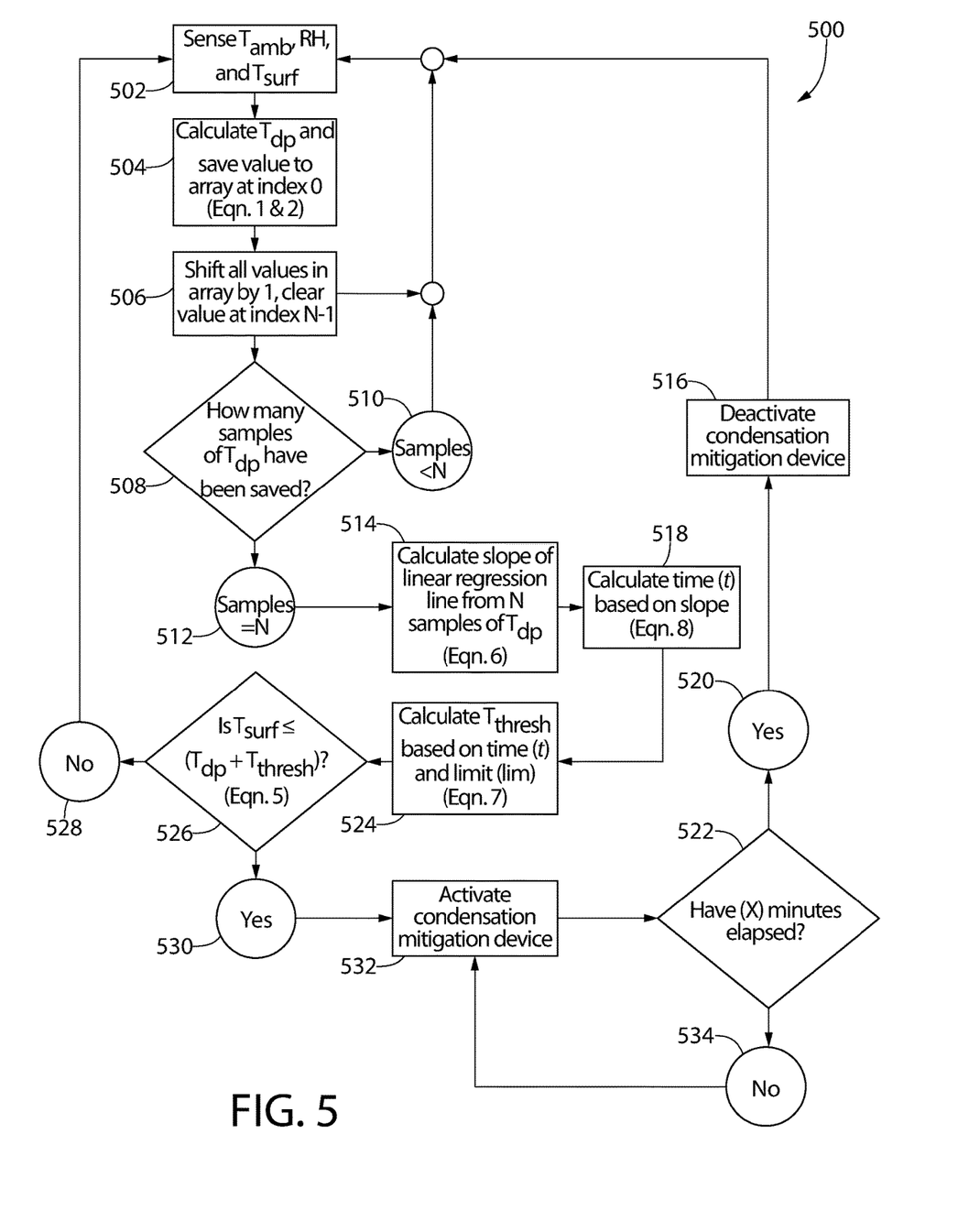
FIG. 5 is an example method of activating condensation mitigation device.

The ambient dew point may be calculated, at 504. The first ambient dew point calculated may be saved in an array, for example, at index 0. The ambient dew point may be calculated based on one or more ambient conditions that may include an ambient temperature, an ambient relative humidity, and/or a surface temperature. For example, ambient dew point may be calculated using Equation 1 and/or Equation 2. All values in the array may be shifted by 1, at 506. The value at index N−1 may be cleared.

At 508, the number of saved samples of dew points may be determined. If the number of samples saved is less than a predefined number (e.g., N), go to 510. If the number of samples saved is equal to N, go to 512.

At 514, the slope of linear regression line may be calculated. For example, the slope of linear regression line may be calculated after a sufficient sampling of ambient conditions (such as a sufficient sampling of dew points). Equation 6 may be used to calculate the slope of the linear regression line.

At 518, a time may be calculated. The calculated time may be the time desired for an ambient dew point to rise to a current surface temperature. For example, the time desired for an ambient dew point to rise to the current surface temperature may be calculated based on an extrapolation from linear regression. Equation 8 may be used to calculate the time desired for ambient dew point to rise to current surface temperature.

At 524, a threshold value (e.g., threshold time) may be determined. The threshold value may be based on a time and a Limit, as described herein. For example, a threshold value may be determined using Equation 7.

At 526, a trigger condition may be checked. For example, it may be determined whether surface temperature is less than or equal to a dew point and a threshold value (e.g., threshold time). The trigger condition may be checked using Equation 5.

If the trigger condition is not satisfied, go to 528. Otherwise, if the trigger condition is satisfied, go to 530. If the trigger condition is satisfied, activate the condensation mitigation device, at 532.

At 522, a determination may be performed of whether a time duration has elapsed (e.g., a time duration has elapsed since the condensation mitigation device was activated). For example, it may be determined if a number (e.g., an X number) of minutes has elapsed. If the time duration has not elapsed, go to 534. After 534, activate the condensation mitigation device or indicate to the condensation mitigation device to continue mitigating the condensation. If the time duration elapses, go to 520. At 516, deactivate the condensation mitigation device (e.g., deactivate the condensation mitigation device as the time duration has elapsed).

Figure 6:
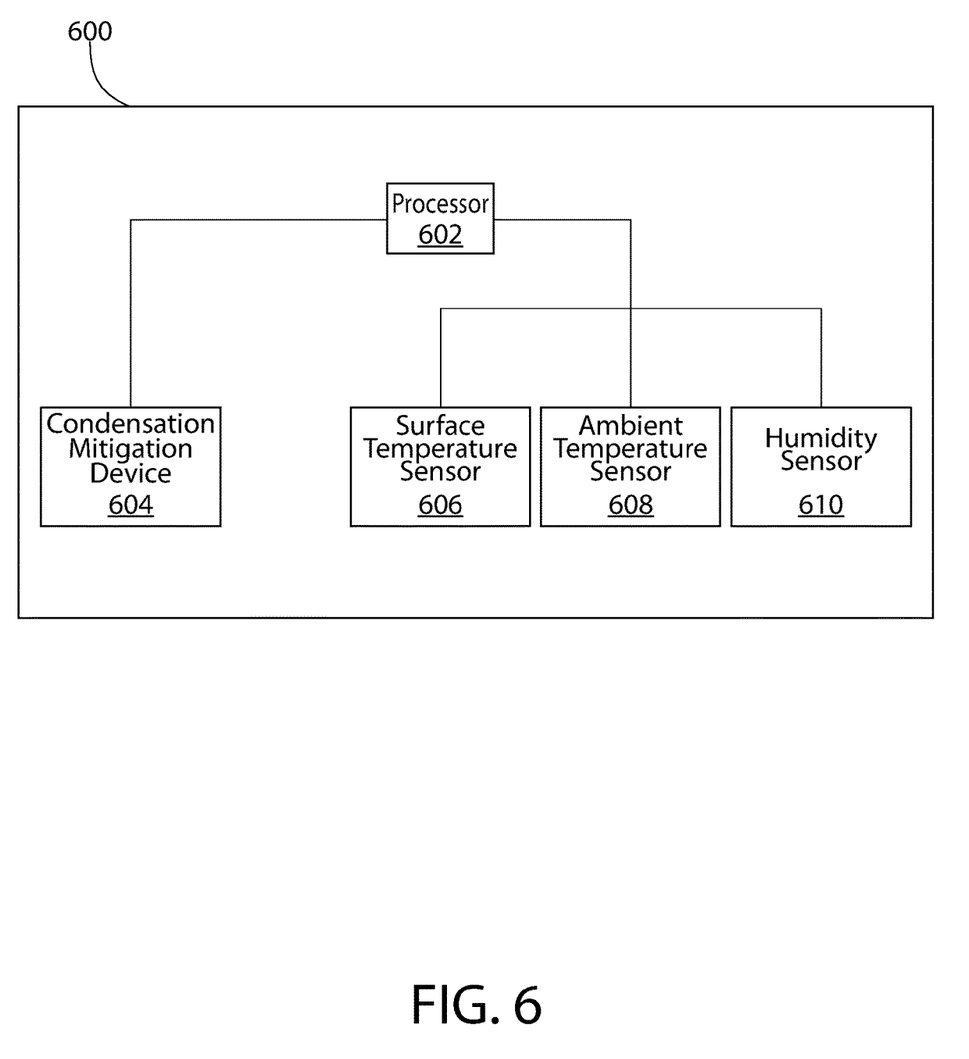
FIG. 6 is an example block diagram of a system including a condensation mitigation device (CMD), surface temperature sensor (STS), ambient sensor (AS), and humidity sensor (HS), as described herein.

FIG. 6 shows a block diagram of an example system 600 for activating and/or deactivating a condensation mitigation device, as described herein. FIG. 6 shows processor 602 coupled to condensation mitigation device (CMD) 604. An example processor may be an ATMega328P processor from Atmel. However, such example is for illustration purposes and any processor known by those of skill in the art may be used, such as any 8-bit MCU. Although FIG. 6 shows processor 602 external to condensation mitigation device 604, such example is for illustration purposes only. One or more processors 602 may be located external to condensation mitigation device 604 and/or internal to condensation mitigation device 604. As described herein, examples of condensation mitigation device 604 may include, but not limited to, a heating element, a fan, a blower, and the like.

Processor 602 may be coupled to (e.g., operably coupled to) one or more sensors, such as surface temperature sensor (STS) 606, ambient temperature sensor (ATS) 608, or humidity sensor (HS) 610. For example, processor 602 may receive signals from one or more of surface temperature sensor 606, ambient temperature sensor 608, or humidity sensor 610. The signals may indicate surface temperatures relating to an object (e.g., glass, mirror, metal, tile, etc.), ambient temperatures relating to the object, and/or humidity conditions relating to the object.

Based on the examples provided herein, triggering of the condensation mitigation device and/or activating the condensation mitigation device may be resistant to conditions not associated with the formation of condensation, such as gradual changes in ambient conditions, changes in temperature (e.g., changes limited to temperature), changes in humidity (e.g., changes limited to humidity), and the like. Also, or alternatively, the triggering and/or activation of the condensation mitigation device may be sensitive to rapid shifts in ambient conditions that are associated (e.g., directly associated) with formation of condensation.

For example, the operating temperature of the condensation mitigation device may function within a range, such as between 0° Celsius and 35° C.—although other operating temperatures may be experienced. The humidity may be within a range, such as between an example relative humidity of 0 and 100%—although other values for the humidity may be experienced.

The condensation mitigation device may have a footprint (e.g., a board footprint), such as a maximum footprint of two inches by three and a half inches—although the condensation mitigation device may have a footprint that is larger, or smaller, than the example footprint. The condensation mitigation device may have an overall (e.g., overall maximum) depth of 0.40 inches. Mounting holes may be positioned on the condensation mitigation device, such as one or more (e.g., each) corner of board. In an example the holes may be configured to accept a #4-40 screw, or the like. The condensation mitigation device may accept power from one or more sources, such as from a 12V power supply.

The condensation mitigation device may include one or more interfaces. An interface may include a connector for input power (e.g., 2-pos, DC 12V); a connector for humidity sensor (e.g., 4-pos), a connector for temperature sensor (e.g., 3-pos), a connector for relay to heating element (e.g., 2-pos, AC 120V), and/or a connector for a switch (e.g., an external lighted switch) to manually activate condensation mitigation device (e.g., 4-pos, DC 5V).

As described herein, sensors may be provided to determine a temperature (e.g., ambient temperature, surface temperature), humidity, and the like. For example, the temperature sensor may be an STLM20, Ultra-low current 2.4 V precision analog temperature sensor. The humidity sensor may be an HDC1080DMBT, HDC1080 Low Power, High Accuracy Digital Humidity Sensor with Temperature Sensor.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. An assembly for preventing condensation on a surface of an object, the assembly comprising:
  a condensation mitigation device positioned on or near an object;
  a processor operably coupled to the condensation mitigation device;
  a surface temperature sensor positioned on or near a surface of the object to sense a temperature;
  an ambient temperature sensor positioned in an area in which the object is located to sense an ambient temperature; and
  a humidity sensor positioned in the area in which the object is located to sense a humidity;
  wherein the processor is operably coupled to the surface temperature sensor, the ambient temperature sensor, and the humidity sensor; and
  wherein the processor is configured to:
    calculate a dewpoint temperature based on the ambient temperature and the humidity;
    repeat the calculation of the dewpoint temperature for different times, the calculated dewpoint temperatures including a current dewpoint temperature;
    calculate a linear regression for the calculated dewpoint temperatures; and transmit a control signal to begin activating the condensation mitigation device, and thereby prevent condensation from forming on the surface of the object;
wherein the transmission of the control signal is based on the surface temperature, the current dewpoint temperature, and the linear regression for the calculated dewpoint temperatures.

2. The assembly of claim 1 wherein the object is a mirror or a glass.

3. The assembly of claim 1 wherein the condensation mitigation device is a heating element.

4. The assembly of claim 1 wherein the processor is further configured to:
calculate a predicted time for the dewpoint temperature to reach the surface temperature based on the linear regression;
wherein the transmission of the control signal is further based on the predicted time.

5. The assembly of claim 4 wherein the processor is further configured to:
calculate a threshold temperature based on the predicted time;
wherein the transmission of the control signal to begin activating the condensation mitigation device occurs when the sum of the current dewpoint temperature and the threshold temperature is greater than or equal to the surface temperature.

6. The assembly of claim 5 wherein the calculation of the time for the dewpoint to reach the surface temperature is based on a slope of the linear regression.

7. The assembly of claim 5 wherein the threshold temperature is further based on a predetermined time limit, the predetermined time limit indicative of how long before the dewpoint temperature reaches the surface temperature at which the condensation mitigation device will be activated.

8. The assembly of claim 1 wherein the slope of the linear regression is not calculated until a predetermined number of calculations of the dewpoint temperature have been determined.

9. The assembly of claim 1 wherein the processor is an 8-bit microcontroller.

10. The assembly of claim 1 wherein:
the condensation mitigation device is affixed to the surface of the object;
the surface temperature sensor is affixed to the surface of the object at a predetermined distance from the condensation mitigation device;
the ambient temperature sensor is located at or near a top side of the object; and
the humidity sensor is located at or near the top side of the object.

11. The method of claim 1 wherein the slope of the linear regression is not calculated until a predetermined number of calculations of the dewpoint temperature have been determined.

12. A method for preventing condensation on a surface of an object, the method comprising:
positioning a condensation mitigation device on or near an object;
operably coupling the condensation mitigation device, a surface temperature sensor, an ambient temperature sensor, and a humidity sensor to a processor;
positioning the surface temperature sensor on or near a surface of the object to sense a surface temperature;
positioning the ambient temperature sensor to sense an ambient temperature in an area in which the object is located;
positioning the humidity sensor to sense a humidity in the area in which the object is located;
calculating, by the processor, a dewpoint temperature based on the ambient temperature and the humidity;
repeating the calculation of the dewpoint temperature for different times, the calculated dewpoint temperatures including a current dewpoint temperature;
calculating, by the processor, a linear regression for the calculated dewpoint temperatures; and
transmitting, by the processor, a control signal to begin activating the condensation mitigation device, and thereby prevent condensation from forming on the surface of the object, wherein the transmission of the control signal is based on the surface temperature, the current dewpoint temperature, and the linear regression for the calculated dewpoint temperatures.

13. The method of claim 12 wherein the object is a mirror or a glass.

14. The method of claim 12 wherein the condensation mitigation device is a heating element.

15. The method of claim 12 further comprising:
calculating, by the processor, a predicted time for the dewpoint temperature to reach the surface temperature based on the linear regression;
wherein the transmission of the control signal is further based on the predicted time.

16. The method of claim 15 further comprising:
calculating, by the processor, a threshold temperature based on the predicted time;
wherein the transmission the control signal to begin activating the condensation mitigation device occurs when the sum of the current dewpoint temperature and the threshold temperature is greater than or equal to the surface temperature.

17. The method of claim 16 wherein the calculation of the time for the dewpoint to reach the surface temperature is based on a slope of the linear regression.

18. The method of claim 16 wherein the threshold temperature is further based on a predetermined time limit, the predetermined time limit indicative of how long before the dewpoint temperature reaches the surface temperature at which the condensation mitigation device will be activated.

19. A non-transitory computer-readable storage medium encoded with instructions which, when executed on a processor, perform a method of:
calculating a dewpoint temperature based on an ambient temperature and a humidity, wherein:
an ambient temperature sensor is positioned to sense the ambient temperature in an area in which an object is located;
the humidity sensor is positioned to sense the humidity in the area in which the object is located; and
a surface temperature sensor is positioned on or near a surface of the object to sense the surface temperature;
repeating the calculation of the dewpoint temperature for different times, the calculated dewpoint temperatures including a current dewpoint temperature;
calculating a linear regression for the calculated dewpoint temperatures; and
transmitting, by the processor, a control signal to begin activating the condensation mitigation device, and thereby prevent condensation from forming on the surface of the object, wherein the transmission of the control signal is based on the surface temperature, the current dewpoint temperature, and the linear regression for the calculated dewpoint temperatures.

20. The storage medium of claim 19:

wherein the object is a mirror or a glass; and wherein the condensation mitigation device is a heating element.

\* \* \* \* \*